United States Patent [19]
Boyer

[11] Patent Number: 5,957,770
[45] Date of Patent: Sep. 28, 1999

[54] VEHICLE DEFROSTER SYSTEM ACCESSORY

[76] Inventor: Steven C. Boyer, 31 Bel Air Dr., Dillsburg, Pa. 17019

[21] Appl. No.: 09/031,512

[22] Filed: Feb. 26, 1998

[51] Int. Cl.$^6$ ..................................................... B60S 1/54
[52] U.S. Cl. ............................................. 454/127; 454/85
[58] Field of Search ................................. 454/127, 133, 454/85, 93, 198

[56] References Cited

U.S. PATENT DOCUMENTS

| | | | |
|---|---|---|---|
| 2,659,942 | 11/1953 | Iverson | 454/127 |
| 2,779,067 | 1/1957 | Stanley | 454/127 |
| 3,452,367 | 7/1969 | Fairbanks | 454/127 |
| 4,105,246 | 8/1978 | Trumbull | 454/127 |
| 4,109,562 | 8/1978 | MacDaonald | 454/127 |
| 5,674,118 | 10/1997 | Prock | 454/127 |

*Primary Examiner*—Harold Joyce
*Assistant Examiner*—Derek S. Boles

[57] ABSTRACT

A new vehicle defroster system accessory for increasing efficiency of a windshield defroster. The inventive device includes a pliable, generally rectangular shield having planar inner and outer surfaces. The shield is positioned over defroster vents of a vehicle and in contact with a lower portion of a windshield. A plurality of suctions cups are secured to the inner surface of the shield. The suction cups secure the shield to the windshield. A plurality of nodules are secured to the inner surface of the shield. The plurality of nodules elevate the shield above the windshield to allow passage of warm air therebeneath.

3 Claims, 2 Drawing Sheets

VEHICLE DEFROSTER SYSTEM ACCESSORY

BACKGROUND OF THE INVENTION

1. Field of the Invention

The present invention relates to defrosters and more particularly pertains to a new vehicle defroster system accessory for increasing efficiency of a windshield defroster.

2. Description of the Prior Art

The use of defrosters is known in the prior art. More specifically, defrosters heretofore devised and utilized are known to consist basically of familiar, expected and obvious structural configurations, notwithstanding the myriad of designs encompassed by the crowded prior art which have been developed for the fulfillment of countless objectives and requirements.

Known prior art defrosters include U.S. Pat. No. 4,693,416 to Hayakawa; U.S. Pat. No. 4,583,448 to Sasaki et al.; U.S. Pat. No. 4,522,114 to Matsuno; U.S. Pat. No. Des. 325,250 to Kloster; U.S. Pat. No. 4,917,933 to Schluter; and U.S. Pat. No. 4,355,064 to Imhof.

While these devices fulfill their respective, particular objectives and requirements, the aforementioned patents do not disclose a new vehicle defroster system accessory. The inventive device includes a pliable, generally rectangular shield having planar inner and outer surfaces. The shield is positioned over defroster vents of a vehicle and in contact with a lower portion of a windshield. A plurality of suctions cups are secured to the inner surface of the shield. The suction cups secure the shield to the windshield. A plurality of nodules are secured to the inner surface of the shield. The plurality of nodules elevate the shield above the windshield to allow passage of warm air therebeneath.

In these respects, the vehicle defroster system accessory according to the present invention substantially departs from the conventional concepts and designs of the prior art, and in so doing provides an apparatus primarily developed for the purpose of increasing efficiency of a windshield defroster.

SUMMARY OF THE INVENTION

In view of the foregoing disadvantages inherent in the known types of defrosters now present in the prior art, the present invention provides a new vehicle defroster system accessory construction wherein the same can be utilized for increasing efficiency of a windshield defroster.

The general purpose of the present invention, which will be described subsequently in greater detail, is to provide a new vehicle defroster system accessory apparatus and method which has many of the advantages of the defrosters mentioned heretofore and many novel features that result in a new vehicle defroster system accessory which is not anticipated, rendered obvious, suggested, or even implied by any of the prior art defrosters, either alone or in any combination thereof.

To attain this, the present invention generally comprises a pliable, generally rectangular shield having planar inner and outer surfaces. The shield is positioned over defroster vents of a vehicle and in contact with a lower portion of a windshield. The shield has an upper edge, a lower edge and opposed side edges. The lower edge has a length greater than a length of the upper edge. The opposed short edges include vertically oriented lower sections and inwardly angled upper sections. A plurality of suctions cups are secured to the inner surface of the shield disposed along the inwardly angled upper sections and the upper edge in a spaced relationship. The suction cups secure the shield to the windshield. A plurality of nodules are secured to the inner surface of the shield disposed along the inwardly angled upper sections and the upper edge in a spaced relationship. The plurality of nodules elevate the shield above the windshield to allow passage of warm air therebeneath.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle defroster system accessory apparatus and method which has many of the advantages of the defrosters mentioned heretofore and many novel features that result in a new vehicle defroster system accessory which is not anticipated, rendered obvious, suggested, or even implied by any of the prior art defrosters, either alone or in any combination thereof.

It is another object of the present invention to provide a new vehicle defroster system accessory which may be easily and efficiently manufactured and marketed.

It is a further object of the present invention to provide a new vehicle defroster system accessory which is of a durable and reliable construction.

An even further object of the present invention is to provide a new vehicle defroster system accessory which is susceptible of a low cost of manufacture with regard to both materials and labor, and which accordingly is then susceptible of low prices of sale to the consuming public, thereby making such vehicle defroster system accessory economically available to the buying public.

Still yet another object of the present invention is to provide a new vehicle defroster system accessory which provides in the apparatuses and methods of the prior art some of the advantages thereof, while simultaneously overcoming some of the disadvantages normally associated therewith.

Still another object of the present invention is to provide a new vehicle defroster system accessory for increasing efficiency of a windshield defroster.

Yet another object of the present invention is to provide a new vehicle defroster system accessory which includes a pliable, generally rectangular shield having planar inner and outer surfaces. The shield is positioned over defroster vents of a vehicle and in contact with a lower portion of a windshield. A plurality of suctions cups are secured to the inner surface of the shield. The suction cups secure the shield to the windshield. A plurality of nodules are secured to the inner surface of the shield. The plurality of nodules elevate the shield above the windshield to allow passage of warm air therebeneath.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
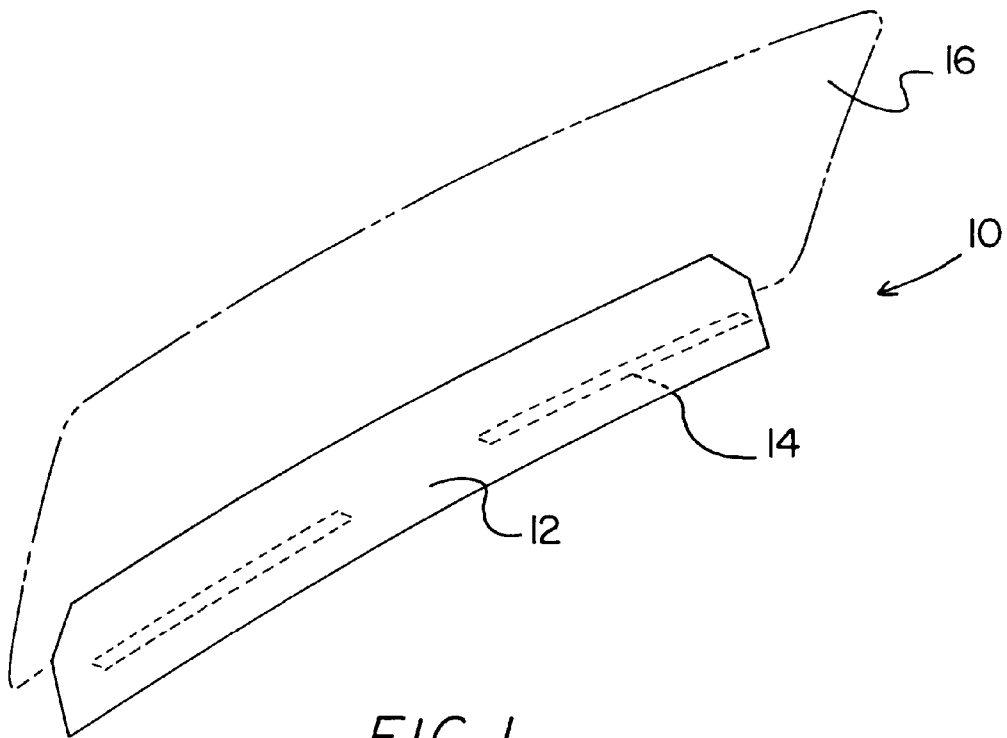
FIG. 1 is a perspective view of a new vehicle defroster system accessory according to the present invention illustrated in use.
Figure 2:
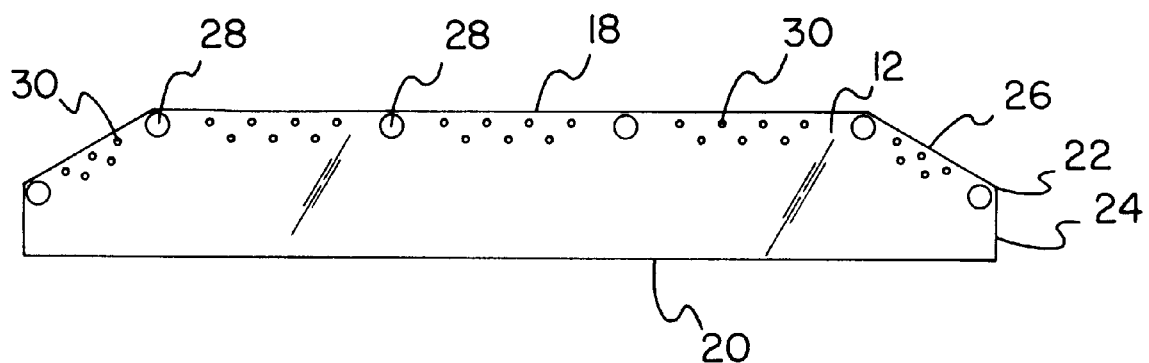
FIG. 2 is a rear elevation view of the present invention.

With reference now to the drawings, and in particular to FIGS. 1 through 4 thereof, a new vehicle defroster system accessory embodying the principles and concepts of the present invention and generally designated by the reference numeral 10 will be described.

As best illustrated in FIGS. 1 through 4, the vehicle defroster system accessory 10 comprises a pliable, generally rectangular shield 12 having planar inner and outer surfaces. The shield 12 is positioned over defroster vents 14 of a vehicle and in contact with a lower portion of a windshield 16. The shield 12 has an upper edge 18, a lower edge 20 and opposed side edges 22. The lower edge 20 has a length greater than a length of the upper edge 18. The opposed short edges 20 include vertically oriented lower sections 24 and inwardly angled upper sections 26.

A plurality of suctions cups 28 are secured to the inner surface of the shield 12 disposed along the inwardly angled upper sections 26 and the upper edge 18 in a spaced relationship. The suction cups 28 secure the shield 12 to the windshield 16.

A plurality of nodules 30 are secured to the inner surface of the shield 12 disposed along the inwardly angled upper sections 26 and the upper edge 18 in a spaced relationship.

The plurality of nodules 30 elevate the shield 12 above the windshield 16 to allow passage of warm air therebeneath.

Figure 3:
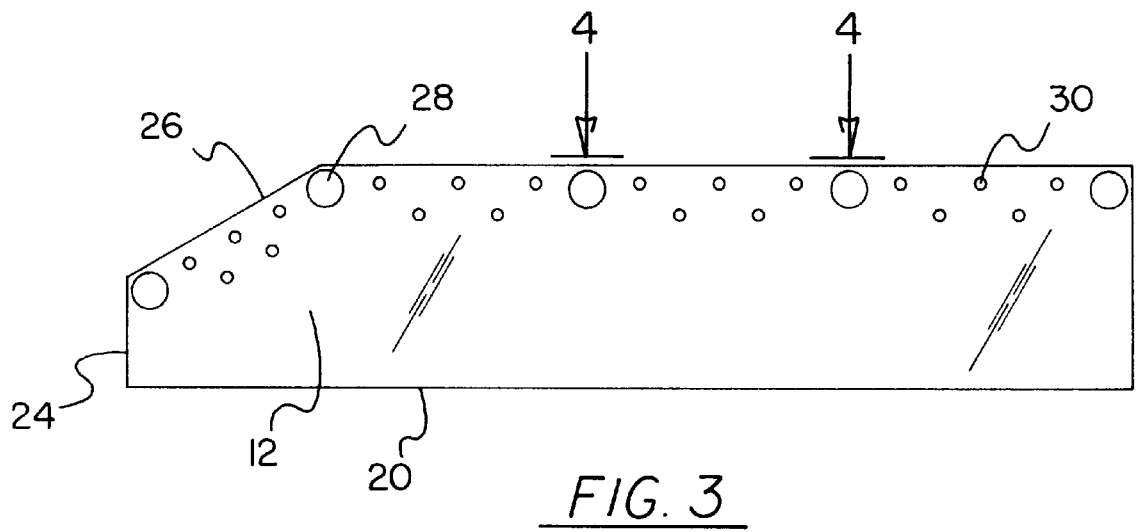
FIG. 3 is a rear elevation view of an alternate embodiment of the present invention.
Figure 4:
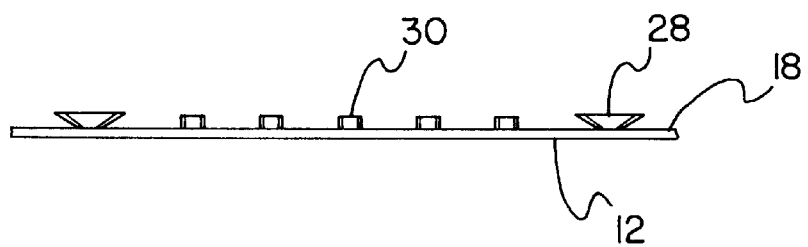
FIG. 4 is a top plan view of the present invention as taken along line 4—4 of FIG. 3.

In use, the device 10 could increase the efficiency of the windshield defroster of a motor vehicle. It would enable the front windshield to be cleared of fog, ice, frost, and snow in a faster and more effective manner. The device 10 would also resist build-up of snow and ice on the outside of the windshield 16 to keep it clear and keep the wipers working properly. The shield 12 would trap the warm air as it is emitted from the defroster vents 14 so it could be better used to clear the glass of ice and snow in the winter. A single-piece version of the shield 12 is illustrated in FIG. 3 which can be used in smaller confined spaces.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new vehicle defroster system accessory for increasing efficiency of a windshield defroster comprising:

a pliable, generally rectangular shield having planar inner and outer surfaces, the shield adapted for being positioned over defroster vents of a vehicle and in contact with a lower portion of a windshield, the shield having an upper edge, a lower edge and opposed side edges, the lower edge having a length greater than a length of the upper edge, at least one of the opposed short edges including a vertically oriented lower section and an inwardly angled upper section;

a plurality of suctions cups secured to the inner surface of the shield disposed along the inwardly angled upper section and the upper edge in a spaced relationship, the suction cups securing the shield to the windshield; and a plurality of nodules secured to the inner surface of the shield disposed along the inwardly angled upper section and the upper edge in a spaced relationship and extending from the shield in perpendicular relationship therewith, the plurality of nodules elevating the shield above the windshield to allow passage of warm air therebeneath.

2. The vehicle defroster system accessory as set forth in claim 1 wherein the nodules each have a substantially right cylindrical configuration.

3. The vehicle defroster system accessory as set forth in claim 1 wherein the nodules include a first set of nodules positioned a first distance from the upper edge and the upper section of the shield and a second set of nodules positioned a second distance from the upper edge and the upper section of the shield, wherein the second distance is greater than the first distance and the nodules of the first set are positioned between the nodules of the second set such that the nodules of the first and second set are staggered.

* * * * *